United States Patent
Dimou (10) Patent No.: US 9,307,438 B2
(45) Date of Patent: Apr. 5, 2016

(54) METHODS AND DEVICES FOR DEACTIVATING A NODE IN A COMMUNICATION NETWORK

(71) Applicant: TELEFONAKTIEBOLAGET L M ERICSSON (PUBL), Stockholm (SE)

(72) Inventor: Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 152 days.

(21) Appl. No.: 14/144,692

(22) Filed: Dec. 31, 2013

(65) Prior Publication Data

US 2015/0189532 A1 Jul. 2, 2015

(51) Int. Cl.
| | |
|---|---|
| *H04W 28/02* | (2009.01) |
| *H04W 8/14* | (2009.01) |
| *H04W 36/16* | (2009.01) |
| *H04W 52/02* | (2009.01) |
| *H04W 84/04* | (2009.01) |

(52) U.S. Cl.
CPC .............. *H04W 28/021* (2013.01); *H04W 8/14* (2013.01); *H04W 28/0226* (2013.01); *H04W 36/165* (2013.01); *H04W 52/0206* (2013.01); *H04W 52/0232* (2013.01); *H04W 84/045* (2013.01)

(58) Field of Classification Search
CPC ...... H04W 36/00; H04W 36/12; H04W 76/04
USPC ................ 455/418, 419, 435.1; 370/331, 352
See application file for complete search history.

(56) References Cited

U.S. PATENT DOCUMENTS

| | | | |
|---|---|---|---|
| 7,142,520 B1* | 11/2006 | Haverinen et al. ............ | 370/311 |
| 2013/0258923 A1 | 10/2013 | Chou et al. | |

FOREIGN PATENT DOCUMENTS

| | | |
|---|---|---|
| EP | 1475984 A1 | 11/2004 |
| WO | 2013022505 A1 | 2/2013 |
| WO | 2013074015 A1 | 5/2013 |

OTHER PUBLICATIONS

Bredbandskollen, Interent Archive, Wayback Machine, Jun. 7, 2012; http://web.archive.org/web/20120607052510/http://www.bredbandskollen.se/mobile.php.

* cited by examiner

*Primary Examiner* — Sam Bhattacharya (57) ABSTRACT

A method for deactivating a first node in a communication network includes determining, in a first time period, a number (A) of active mobile UE devices in a first network cell; determining a number (B) of static UE devices in the first network cell; and determining a number (C) of requests for direct D2D communication from UE devices in the first network cell. The method includes estimating a number of active UE devices in the first network cell for a second time period based on one or more of A, B, and C and determining whether the estimated number of active UE devices is less than a threshold. If so, the method includes transmitting a request to a second node to take over communication with one or more of the UE devices. If the request is accepted by the second node, the first node is deactivated.

22 Claims, 7 Drawing Sheets

METHODS AND DEVICES FOR DEACTIVATING A NODE IN A COMMUNICATION NETWORK

TECHNICAL FIELD

The present invention relates generally to communication across a network, and more particularly, to methods and devices for deactivating a node in a communication network.

BACKGROUND

The constantly increasing demand for high data rates requires communication networks, including cellular networks, that can meet this demand. In addition, the networks must meet the demand under the evolving types of wireless communication within networks, such as M2M communication and D2D communication.

M2M communication involves the communication of wireless devices/instruments/sensors transmitting primarily measurement reports, triggers, readings, and event detection messages to a serving base station. The traffic and messages generated/transmitted by these wireless sensors/devices is typically sporadic, mainly uplink in direction, and of short duration in most of the cases. D2D communication involves direct communication between devices/sensors or simply mobile phones. This direct communication takes place in the same spectrum as communication used by network operators for the normal communication between mobile phone and base stations. It is therefore anticipated that this direct D2D communication is going to be somehow supervised by the network. The traffic generated from these D2D devices can be anything ranging from low data rate traffic consisting of small packets to high data rates involving the exchange of lengthy data files.

A challenging question for operators is how to evolve their existing cellular networks so as to meet these different and dynamic requirements for both higher data rates and for increased signaling. In addition, the requirement for efficient energy consumption is constantly increasing. In this respect, a number of directions are possible, such as: i) increasing the density of existing macro base stations in the network, ii) increasing cooperation of macro base stations among each other, or iii) deploying smaller base stations in areas where high data rates are needed within a macro base station grid, such as in a Heterogeneous Network/Deployment, (with requisite increased cooperation between macro and smaller base stations).

The option of building a denser macro base stations grid and probably enhancing the cooperation with macro base stations (hence, using options i) or ii) above) can be a solution for meeting the demand for higher data rates. However, this solution is often not a cost-efficient option, because costs and delays associated with the installation of macro base stations, especially in urban areas, can be significant. The same cost and time disadvantages apply for the deployment of macro base stations in isolated rural areas. In addition, a dense deployment of macro base stations could lead to a significantly high amount of signaling due to frequent handovers between macro base stations for users moving at high speeds.

In this landscape, the solution of deploying small base stations within an already existing macro layer grid is a possible option, such as within a "micro" or "pico" layer of a heterogeneous communication network. The reason is that these small base stations are expected to be more cost-efficient than macro base stations, and their deployment time is shorter as well. The macro layer grid can serve users moving at high speed, or wider geographic areas where the demand for high data rates is not that great. The network grid consisting of small base stations or micro base stations can cater to a high density of users requesting high data rates, or hotspots, as these areas are termed. However, a cost-efficient solution to finding efficiencies and satisfying evolving data demands should serve both the macro layer and the micro layer of the communication network.

To optimize the deployment of small base stations grids within an existing grid of macro base stations, or the deployment of macro base stations in isolated rural area, two main challenges are faced. The first and the most important one is where a high concentration of users or wireless sensors/devices is located. Once these hotspots of mobile phones, sensors, or devices are identified, the question is whether the location of the hotspot is such that the demanded high data rate and high levels of signaling can be met by the existing macro layer. Under a further consideration, and assuming that the deployment of smaller base stations has been in an optimal or almost optimal manner, then there might be cases where it is neither cost efficient nor energy consumption efficient for all the installed macro, smaller base stations, and relays to be constantly active. As an example, consider a group of relay nodes placed in or near a crop field, with the main goal of receiving measurement reports from wireless sensors deployed throughout the field, with the sensors detecting such elements has temperature, humidity, rainfall, and the like. These wireless sensors report only at specific time instants during the day; e.g., only in the morning, or only in the night. Consequently, the constant activity of these relay nodes is not needed, and it is considered inefficient in terms of energy consumption. Therefore, there is the need to have knowledge at the network regarding the number of active terminals/devices/sensors within a given geographic area. Such information would be very useful for the network to provide efficient energy use.

To efficiently activate/deactivate a number of base stations within a geographic area, there is a need to have available information at the network on the activity of User Equipment devices (UE) in the area. Considering that new types of activities are involved in the latest versions of 3GPP LTE, such as M2M and D2D communication types, it is not sufficient to merely have information such as User Equipment (UE) activity times or Discontinuous Reception (DRX) cycles of UEs. More advanced radio statistics are needed for this purpose in addition to new types of information related to these new types of communication.

When determining whether and where to place new base stations in locations where high concentrations of users or wireless sensor/devices is observed, such decisions in the past have been made by use of Global Positioning System (GPS), or other similar UE positioning mechanisms. However a major disadvantage of both GPS and other positioning mechanisms is their known poor performance indoors. Another drawback with these positioning mechanisms is that wireless sensors/devices are expected to be of low complexity and hence cost, and they are required to consume little energy. It is therefore highly questionable whether these devices are going to have GPS functionality embedded. Further, in urban areas, a large number of the wireless sensors/devices are going to be located indoors.

Moreover, there is a difference between the geographic position and the radio link quality experienced by an UE or a wireless sensor; e.g., a given UE might be located geographically close to a serving macro base station, but the quality of its radio link to the serving macro base station can be low. The efficiency of introducing a micro or pica cell within a macro network is strongly dependent on the radio relation, or strength of the link, with the serving macro cell.

SUMMARY

Particular embodiments of the present invention are directed to methods and devices for deactivating a node in a communication network.

According to certain embodiments, a method is provided for deactivating a first node in a communication network, the first node communicating with one or more user equipment (UE) devices in a first network cell and receiving measurement information from the one or more UE devices. The method includes receiving at the first node reference signal information from the one or more UE devices; determining, during a first time period (T1), from the received reference signal information a number (A) of active mobile UE devices in the first network cell; and receiving at the first node mobility pattern information from the one or more UE devices. The method further includes determining, during the first time period, from the received mobility pattern information a number (B) of static UE devices in the first network cell; collecting at the first node Device to Device (D2D) communication requests; and determining, during the first time period, from the collected D2D communication requests a number, (C) of requests for direct D2D communication from UE devices in the first network cell. The method also includes estimating the number of active UE devices (S2) in the first network cell during a second time period (T2) from one or more of the numbers A, B, and C and determining whether the estimated number of active UE devices in the first network cell during the second time period is less than a first threshold (TH1). If the estimated number of active UE devices in the first network cell during the second time period is less than the first threshold, TH1 the method further includes transmitting a request to a second node in the communication network to take over communication with one or more of the UE devices in the first network cell and deactivating the first node.

In accordance with certain embodiments, the method further includes comparing a number of estimated active UE devices in the first network cell with a number (S3) of estimated active UE devices communicating with the second node in a second network cell and comparing the numbers of estimated active UE devices in the first and second network cells (S2 and S3) with the first threshold. If both S2 and S3 are less than the first threshold, the method further includes transferring communication between the UE devices and the node having fewer estimated active UE devices to the node having more estimated active UE devices and deactivating the node with the fewer estimated active UE devices.

Particular embodiments further provide a first node operable in a communication network, the first node communicating with one or more user equipment (UE) devices in a first network cell and receiving measurement information from the one or more UE devices, the first node including a processor; a memory coupled to the processor; a transceiver coupled to the processor; and an antenna coupled to the transceiver configured to transmit and receive messages. The processor is configured to receive reference signal information from the one or more UE devices; determine, during a first time period (T1), from the received reference signal information a number (A) of active mobile UE devices in the first network cell; and receive mobility pattern information from one or more of the UE devices. The processor is further configured to determine, during the first time period, from the received mobility pattern information a number (B) of static UE devices in the first network cell; receive Device to Device (D2D) communication requests; and determine, during the first time period, from the collected D2D communication requests, a number (C) of requests for direct D2D communication from UE devices in the first network cell. The processor is further configured to estimate a number of active UE devices (S2) in the first network cell during a second time period (T2) from one or more of the numbers A, B, and C and determine whether the estimated number of active UE devices in the first network cell during the second time period is less than a first threshold (TH1). If the estimated number of active UE devices in the first network cell during the second time period is less than the first threshold (TH1) the processor is further configured to transmit a request to a second node in the communication network to take over communication with the one or more UE devices in the first network cell and to deactivate the first node.

In certain embodiments, the processor is further configured to, after transmitting the request to the second node to take over communication with the one or more UE devices, receive from the second node a request for a number of active UE devices communicating with the first node; transmit, to the second node, information indicating a number of estimated active UE devices in the first network cell during at least one of the first time period and the second time period; and receive a message from the second node rejecting the request if the indicated number exceeds a second threshold (TH2).

Certain embodiments provide for a method for determining whether to accept handover of UE devices from a first node to a second node in a communication network, the first node communicating with one or more UE devices in a first network cell and the second node communicating with zero or more UE devices in a second network cell. The method includes receiving at a second node a message from the first node requesting handover of UE devices from the first node; and determining whether a number (M) of non-active UE devices in the first network cell is greater than a number (K) of non-active UE devices in the second network cell plus a third threshold (TH3). If the number of non-active UE devices in the first network cell is greater than the number of non-active UE devices in the second network plus the third threshold, the method further includes determining whether the second node has sufficient resources to accommodate the number of UE devices requested to be handed over from the first node. If the second node has sufficient resources to accommodate the number of UE devices requested to be handed over from the first node, the method further includes transmitting an acceptance message to the first node acknowledging acceptance of the UE devices handover request.

According to particular embodiments, the method further includes comparing the geographic coverage of the second network cell with the geographic coverage of the first network cell and determining whether the geographic coverage of the second network cell overlaps any part of the geographic coverage of the first network cell. If there is no overlapping coverage between the second and first network cells, the method further includes sending a message to the first node rejecting the handover request.

In some embodiments, a method is provided for determining the location for placement of a new node in a communication network, the new node to be placed within a first network cell having a base station node. The method includes receiving at the base station node reference signal information (RSRP1) from one or more UE devices in the first network cell; receiving at the base station node neighboring reference signal information (RSRP2) representing reference signal information for one or more UE devices outside of the first network cell; and comparing the ratio of RSRP1 to RSRP2 to a fourth threshold (TH4). If the ratio of RSRP1 to RSRP2 is less than or equal to the fourth threshold, the method further includes determining an angle of arrival (AA1) for the one or more UE devices in the first network cell based on the received RSRP1 information and comparing the angle of arrival to a first threshold angle of arrival (ATH1) and to a second threshold angle of arrival (ATH2). If AA1 is between ATH1 and ATH2, the method further includes establishing a location for placement of the new node within the first network cell to be between the first and second threshold angles of arrival, ATH1 and ATH2.

BRIEF DESCRIPTION OF THE DRAWINGS

The accompanying drawings, which are incorporated here land form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods and devices for deactivating a node in a communication network.

In the following description, numerous specific details are set forth. However, embodiments of the invention may be practiced without these specific details. In other instances, well-known circuits, structures and techniques have not been shown in detail in order to not obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams are described with reference to the exemplary structural embodiments illustrated in the figures. However, the operations of the flow diagrams can be performed by structural embodiments of the invention other than those discussed with reference to figures, and the embodiments discussed with reference to figures can perform operations different than those discussed with reference to the flow diagrams.

Figure 1:
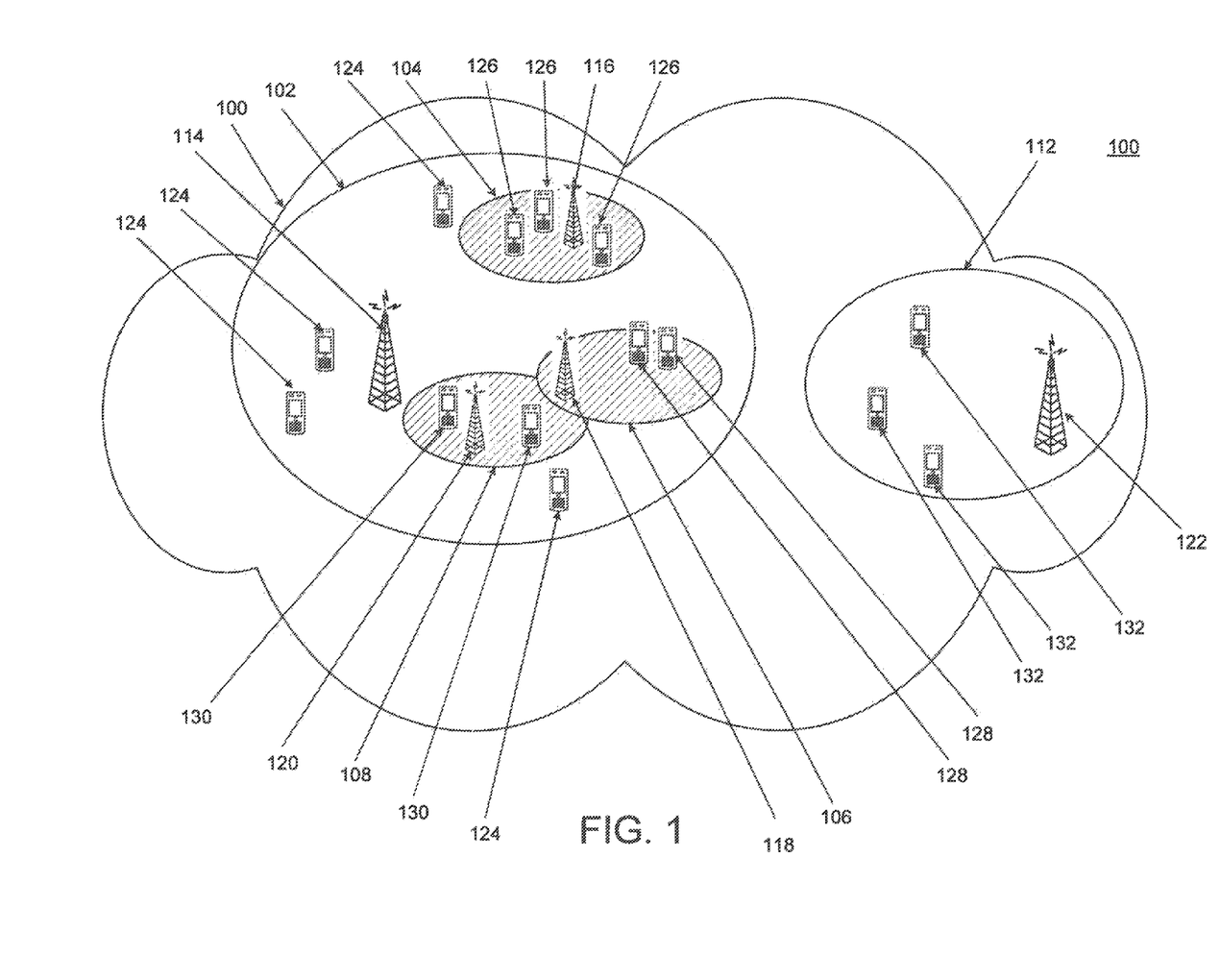
FIG. 1 illustrates a multi-layer architecture of heterogeneous and homogeneous communication networks for implementing a method for deactivating a node in a communication network, in accordance with exemplary embodiments of the present invention.

Exemplary methods and devices in a communication network for facilitating efficiency and meeting data demands are directed to a communication network where statistics are collected from various types of UEs so as to detect activity within a given geographic area. Referring to FIG. 1, there is shown a multi-layer architecture of heterogeneous 102 and homogeneous 112 communication networks for implementing a method for deactivating a node in a communication network. As shown, communication network 100 includes wireless networks 102 and 112, nodes 114, 116, 118, 120, and 122. Node 114 is a macro node in a heterogeneous network 102; nodes 116, 118, and 120 are low power, micro, pico, or femto nodes (hereinafter micro nodes) in respective micro cells 104, 106, and 108; and node 122 is a base station node in a homogeneous network 112. Examples of nodes 114 and 122 include base stations and relay nodes, such as, for example, serving eNodeB (eNB), high power, macro cell base stations, and relay nodes. Examples of nodes 116, 118, and 120 include base stations and relay nodes, such as, for example, low power, micro, pico, and femto base stations. Communicating with the nodes are user equipment devices (UEs) 124, 126, 128, 130, and 132. Examples of UE devices 124, 126, 128, 130, and 132 include wireless user equipment and communication devices, such as, for example, mobile telephones, personal digital assistants, electronic readers, portable electronic tablets, personal computers, laptop computers, detection instruments, and sensors.

Figure 2:
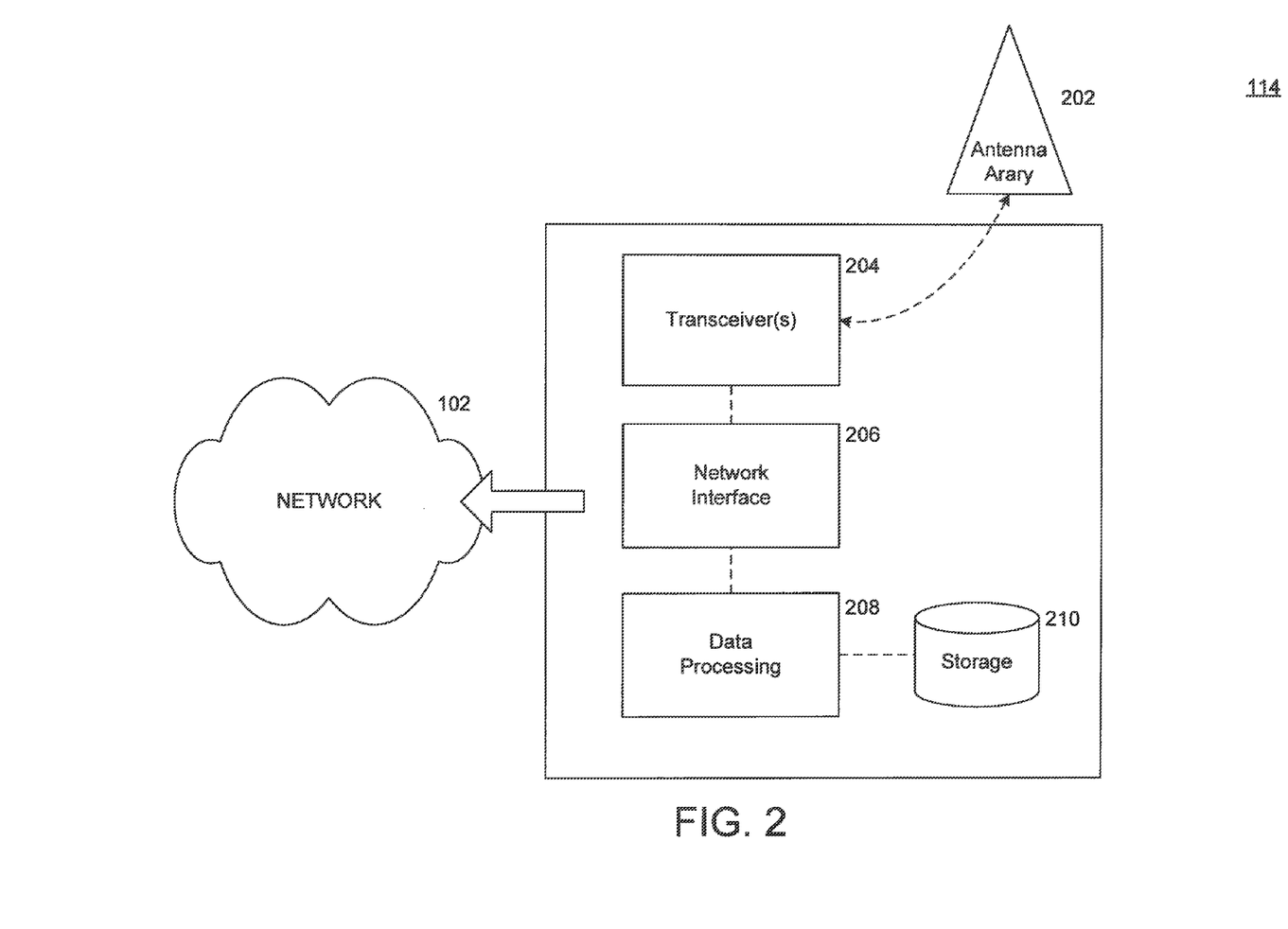
FIG. 2 is a block diagram of a base station or relay, as used in the communication networks of FIG. 1, in accordance with exemplary embodiments of the present invention.

Referring now to FIG. 2, a block diagram of nodes 114-122, as used in the communication networks of FIG. 1 in accordance with exemplary embodiments, is illustrated. As shown in FIG. 2, nodes 114-122 may include: a data processing system 208, which may include one or more microprocessors and/or one or more circuits, such as an application specific integrated circuit (ASIC), Field-Programmable Gate Arrays (FPGAs), and the like; network interface 206; and a data storage system 210, which may include one or more non-volatile storage devices and/or one or more volatile storage devices (e.g., random access memory (RAM)). The network interface 206 is connected to a transceiver 204, which is configured to transmit and receive signals via an antenna array 202. The antenna array 202 can comprise one or more antennas, with the one or more antennas being directional antennas which direct signals to and receive signals from particular sectors of a geographic area, or network cell, covered by the node.

In embodiments where the data processing system 208 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 208 to perform steps described below (e.g., steps described below with reference to the flow charts shown in FIGS. 4, 5, and 7). In other embodiments, the nodes 114-122 are configured to perform steps described above without the need for code. That is, for example, the data processing system 208 may consist merely of one or more ASICs. Hence, the features of the present embodiments described above may be implemented in hardware and/or software. For example, in particular embodiments, the functional components of the nodes 114-122 described above may be implemented by the data processing system 208 executing computer instructions, by the data processing system 208 operating independent of any computer instructions, or by any suitable combination of hardware and/or software.

Figure 3:
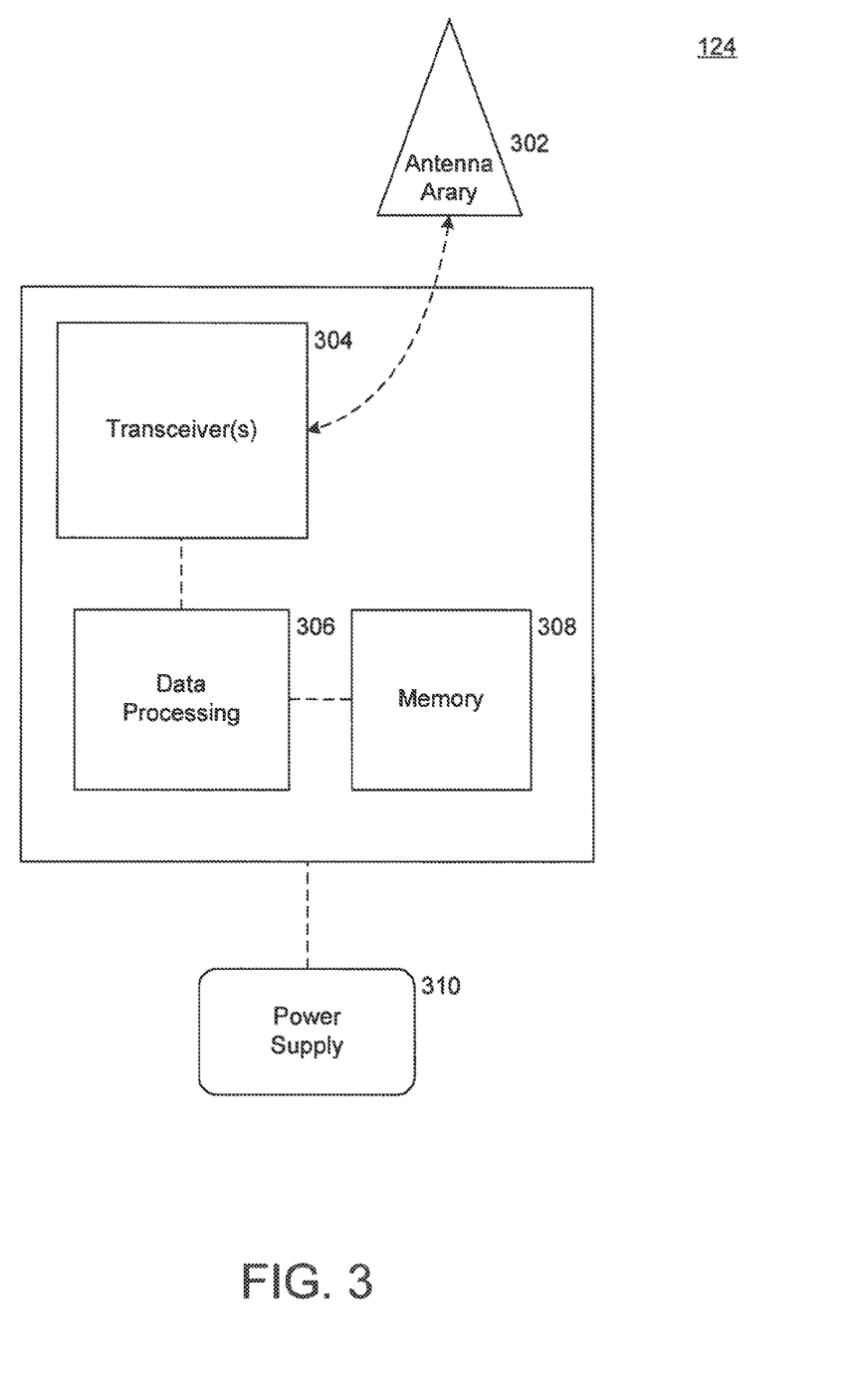
FIG. 3 is a block diagram of a User Equipment (UE) device, as used in the communication networks of FIG. 1, in accordance with exemplary embodiments of the present invention.

Referring now to FIG. 3, a block diagram of a UE device, shown as exemplary device 124 used in the communication networks of FIG. 1 in accordance with exemplary embodiments, is illustrated. As shown in FIG. 3, the UE 124 may include: a data processing system 306, which may include one or more microprocessors and/or one or more circuits, such as an application specific integrated circuit (ASIC), Field-Programmable Gate Arrays (FPGAs), and the like; a transceiver 304 for transmitting data to (and receiving data from) nodes 114-122 via an antenna array 302; and a memory 308, which may include one or more non-volatile storage devices and/or one or more volatile storage devices (e.g., random access memory (RAM)).

In embodiments where the data processing system 306 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the UE 124 to perform steps described below (e.g., steps described below with reference to the flow charts shown in FIGS. 4, 5, and 7). In other embodiments, UE 124 is configured to perform steps described above without the need for code. That is, for example, data processing system 306 may consist merely of one or more ASICs. Hence, the features of the present invention described above may be implemented in hardware and/or software. For example, in particular embodiments, the functional components of UE 124 described above may be implemented by the data processing system 306 executing computer instructions, by data processing system 306 operating independent of any computer instructions, or by any suitable combination of hardware and/or software.

Data, measurements, statistics, and information regarding activity of and actions by the UEs 124-132 are collected and reported by the UEs or are available at the nodes 114-122. Embodiments make use of this information to determine whether to activate/deactivate one or more network nodes 114-122 within a given geographic area. High concentration of users and activity is detected by one or more of collecting radio measurements reported by network operators and UEs, by requests from UEs for direct D2D communication (signaling), detection/identification of wireless sensors/devices communicating according to M2M patterns (signaling), and Discontinuous Reception (DRX) cycle statistics from UEs. Based on this knowledge, relay nodes, micro nodes, base stations, central network nodes, gateways, or network operators within a given area can determine, after negotiation between them, which nodes to temporarily shut down, or deactivate.

The methods in the disclosed exemplary embodiments are described in the context of 3GPP Rel. 12 and beyond, a.k.a. as "Beyond 3GPP Long Term Evolution Advanced (B LTE A, or LTE B)". However, the applicability of the disclosed methods is not limited to 3GPP Rel. 12 and beyond, a.k.a. as "Beyond 3GPP Long Term Evolution Advanced (B LTE A, or LTE B)" and may be applicable for use with other wireless network architectures, protocols, and the like. The methods are applicable for Open Access (OA) micro base stations or relay nodes or macro base stations which are deployed by a network operator so as to increase its system throughput and the capacity in terms of number of users or wireless devices connected to it. This does not, however, preclude the use of the methods for the deactivation/activation/deployment of Closed Subscriber Group (CSG) small base stations or relay nodes; e.g. in cases where the owner of the CSG base station or relay node wants to install a small base station or relay node in areas where the existing macro cellular network does not provide the required data rates within the CSG small base station owner's geographic area of control. The methods are further applicable to homogeneous network cells 112 where a base station 122 can be deactivated and communication with its UEs 132 is transferred to a nearby base station. Typically, communication with the UEs 132 is transferred prior to deactivating the node 122.

In a first exemplary embodiment of the present invention, there is provided a method and apparatus located either at a base station 114 or within another network node 120 or 122 for collecting statistics, readings, and information on the number/concentration of active UEs and for determining, based on this information, whether base stations or relay nodes can be deactivated for a given time period. In a second exemplary embodiment of the present invention, high concentrations of UEs can be detected by combining reference signal information, such as but not limited to, Reference Received Signal Power (RSRP) measurements, and angle of arrival information for the UEs.

In third exemplary embodiment, the methods described in the first and second embodiments can be combined with the knowledge of the number of the existing UEs active in the area. Such knowledge can be provided by: i) combining knowledge from RSRP measurements and from the DRX state ("active", or "sleep" mode) and/or ii) the knowledge of the number of static UEs within the network cell. Method i) is particularly useful when mobile phones and devices are being measured/detected, and method ii) is most useful when the UEs are wireless instruments/sensors. It is expected that a high number of the installed wireless instruments/sensors is going to be static and/or that most of these UEs are not going to move often. In other words, such instruments/devices/sensors are typically, but not always, installed for transmitting readings from a fixed location. Often, such devices transmit intermittently, upon event or upon command. For example, they may wake up once an hour to send information. In these cases, the UEs can report their low mobility pattern, i.e. the fact that these UEs are static to the network. In addition, the network can detect that a certain number of UEs in the network cell are static. For example, UE reference signal information, such as RSRP information and angle of arrival information, can be used to identify the existence of high concentrations of UEs. Knowing that all or most of these UEs are static, the operator or user can determine that this information is a strong indicator of the existence of a high concentration of UEs or users.

In a fourth exemplary embodiment of the present invention, information obtained from one or more of the first three embodiments can be combined with information on the DRX activity cycle of the UEs to decide which nodes to deactivate/activate. It is initially noted that the DRX activity of a typical broadband user is not well suited for consideration of the deactivation/activation of its base stations and relay nodes. This is because DRX sleep modes for a mobile broadband user are typically in the order of some dozens of milliseconds, which is a short time interval that is not sufficient to justify the deactivation of a network node. However, there are circumstances where the UE DRX sleep periods are expected to be much longer than a few milliseconds, and the knowledge of DRX parameters for wireless sensors/devices can be useful. For example, knowledge at the node, gateway, or serving base station of instruments/sensors/devices being in extended sleep mode for minutes/hours and waking up for transmitting a measurement to the network can be used to determine static UEs and/or anticipated activity levels and loads.

In a fifth exemplary embodiment of the present invention, information obtained from one or more of the first four embodiments can be combined with information of UEs seeking D2D communication, so as to define the number of active users within a geographic area. The manner by which UEs can detect each other (known as device discovery, neighbor discovery, or peer discovery) for peer-to-peer or D2D communication within a commercial network has not yet been adopted as a standard. Several academic proposals have been made in the past, mainly involving transmission of beacon signals between the involved devices. However, it is very probable that such detection of devices within the same cellular network is going to take place with the help/supervision of the network offering its band to the UEs.

Under one proposal, a UE-B periodically transmits "D2DInfo" as part of the uplink shared channel (UL-SCH) to its base station node. This message may contain information on the type of service/contents that UE-B is available to share with other UEs in the surrounding area. If unlicensed bands are used, this message may also contain information on the unlicensed band that UE-B is using, By means of the periodic "D2DInfo" message, the serving node is able to estimate the position of UE-B. The node periodically broadcasts a "D2DConfiguration" message as part of the broadcast channel (BCH). This message contains a list of UEs currently available for D2D communication (e.g. UE-B) and the corresponding types of service/contents available to be shared. The message also contains the frequency bands and preambles to adopt when trying to access the UEs in the mentioned list (e.g. UE-B). UE-A detects the list in "D2DConfiguration" and transmits a "D2DRequest" to the node as part of a random-access channel (RACH). The message contains a list of D2D-capable UEs to which UE-A would like to establish a D2D connection. The decision to select the UEs in such a list depends on the frequency bands used and on the types of service/contents available, etc. With such D2D detection information, the a node is aware of UEs that are active and are at least attempting to communicate with each other in the node's network cell or geographic area.

In a sixth exemplary embodiment of the present invention, the number of active users within the network cell coverage area of a node, as obtained by one or more of the first five embodiments is exchanged with a nearby neighboring node. Between these two nodes, the node with the fewer number of active users and with a number of active user less than a predetermined threshold is deactivated.

Figure 6:
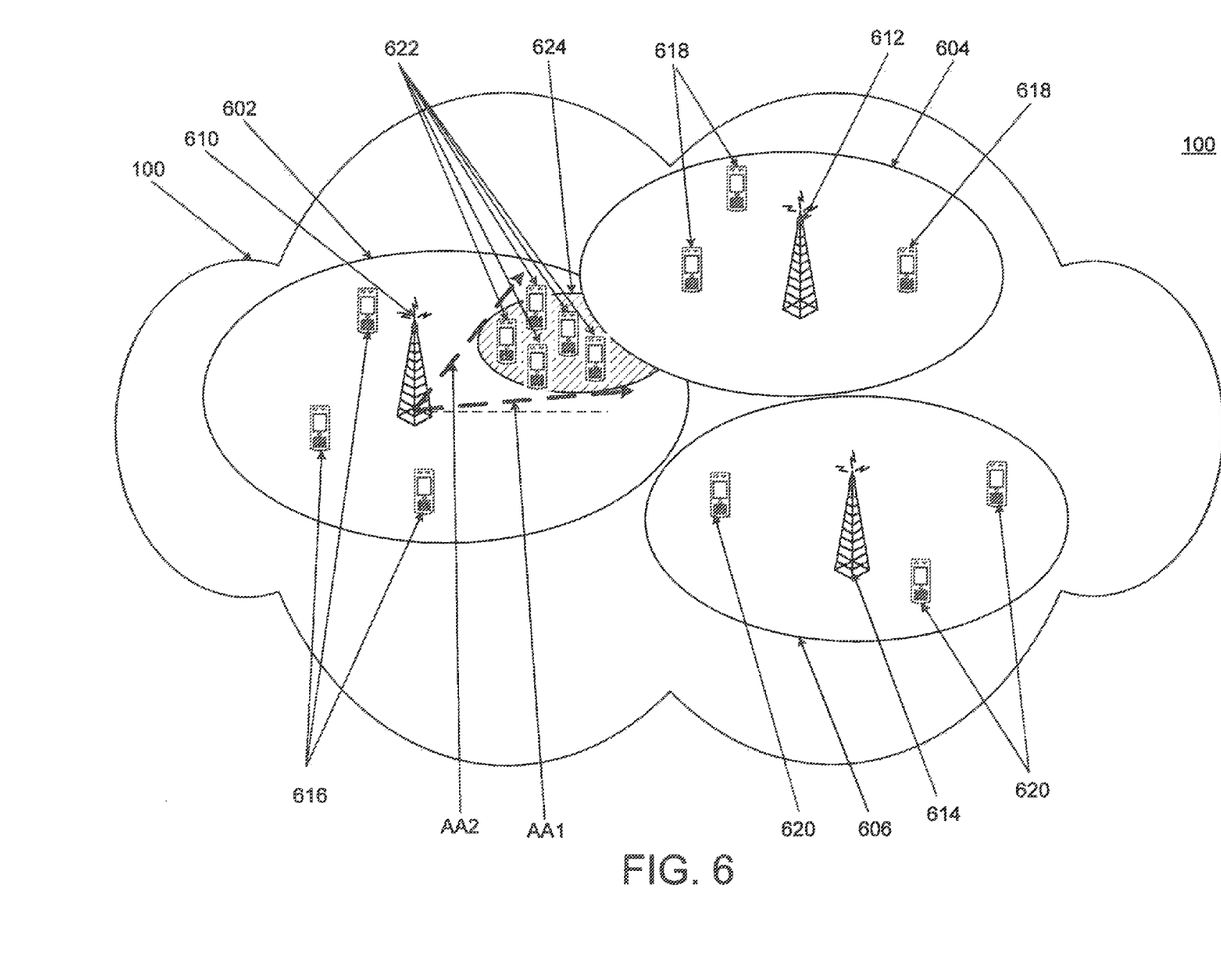
FIG. 6 illustrates an architecture of a communication network for determining the location for placement of a new node in a network cell in accordance with exemplary embodiments of the present invention.

In a seventh exemplary embodiment of the present invention, neighboring cells are checked for having overlapping areas or whether at least a part of a neighboring cell is overlapping. While this scheme may be more suitable for small base stations or relay nodes 116-120 being in the coverage area of larger macro base stations 114, as shown in FIG. 1, this embodiment can also be applied to homogeneous networks, as shown in FIG. 6, with overlapping coverage areas 602 and 604. If there are found to be overlapping cells, the micro base station (116, for example) can switch off/be deactivated, and the overlaying macro base station 114 can take over the active users under control of the smaller network node 116. However, this method is not limited only to heterogeneous networks and not only between macro and smaller base stations. For example, neighboring micro nodes 118 and 120 can employ the same method to deactivate node 118, for example, and transfer communication with UEs 128 to micro node 120. Similarly, neighboring homogeneous nodes (one such node 122 is shown in FIG. 1) can utilize these methods to deactivate one node and transfer communication with its UEs to a neighboring homogeneous node.

In an eighth exemplary embodiment of the present invention, and in combination with one or more of the first seven embodiments, the node with the highest number of active UEs (and also remaining activated) requests the total number of users under control of a neighboring smaller node that will be active during a given time period. If this number of active users is higher than a threshold TH2, then the node refuses to take over the remaining active users under control of the smaller network node and transmits a rejection message to the neighboring node. The first and second thresholds, TH1 and TH2, may or may not be the same, based on the configuration of the network and the priorities/preferences of the network operator.

Figure 4:
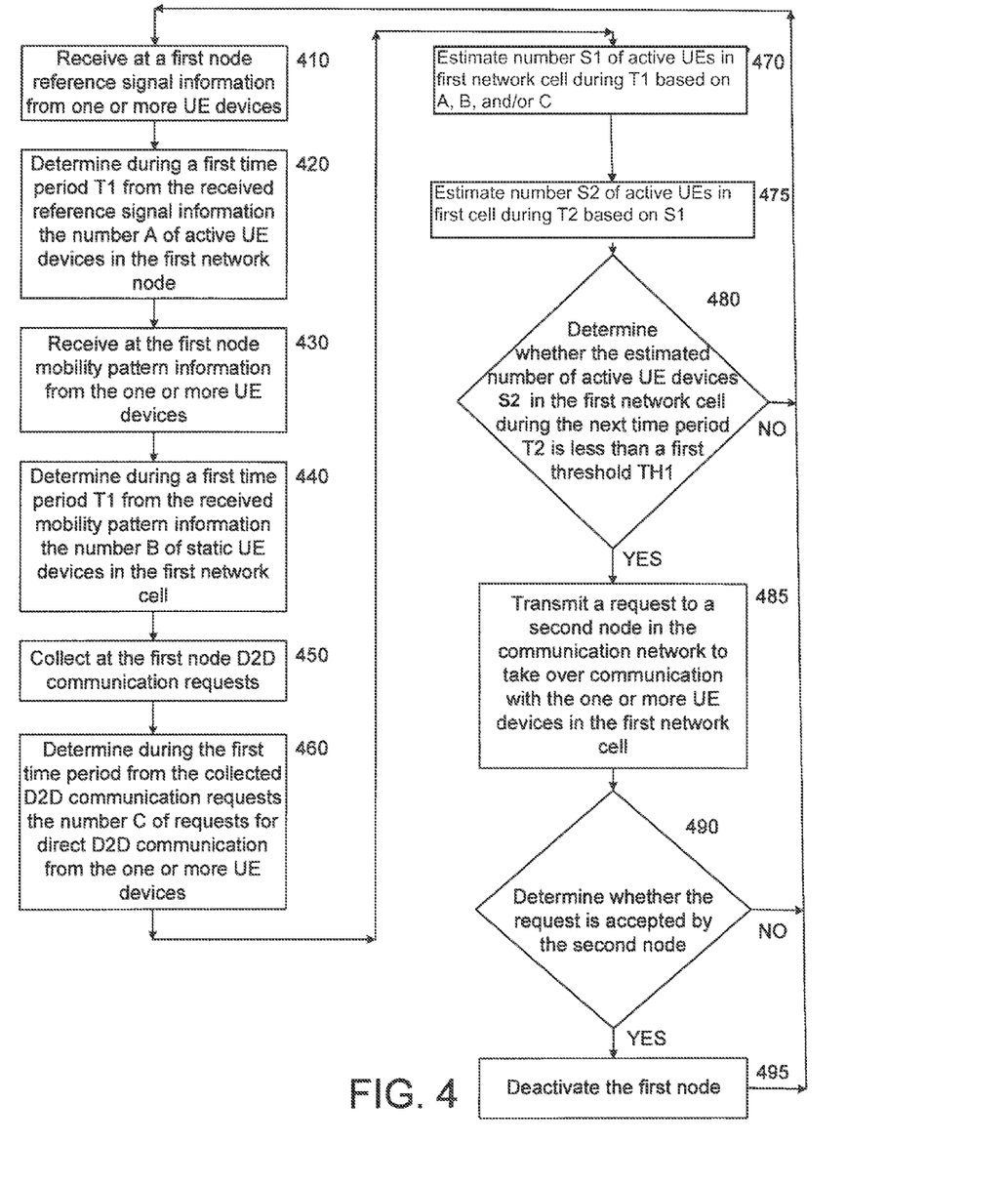
FIG. 4 is a flowchart illustrating the steps for deactivating a network node in accordance with exemplary embodiments of the present invention.

Referring now to FIG. 4, there is shown a flowchart illustrating the steps for deactivating a network node in accordance with exemplary embodiments of the present invention. While the embodiments disclosed can be applied for both heterogeneous and homogeneous networks, the following discussion will utilize the heterogeneous elements of FIG. 1 for illustrative, not limiting, purposes. Accordingly, for the sake of illustration, the first network node originating the procedure described here can be an open access micro base station 118. The second neighboring network node responding to the request from the first network node 118 and whose actions are described in FIG. 5 can be a macro base station 114. The coverage area 102 of the macro base station 114 contains the cell 106 of the open access micro base station 118 in discussion here. However the described techniques may be applied with respect to any type of neighboring base stations.

At step 410 of FIG. 4, the node 118 receives and begins collecting reference signal information, such as RSRP measurements, from UEs 128 in the controlled cell 106. The received reference signal information can comprise one or more of Channel Quality Indicator (CQI) information, Reference Signal Received Power (RSRP) information, and Reference Signal Received Quality (RSRQ) information. The received reference signal information can further include Signal to Interference-plus-Noise Ratio (SINR) information for the one or more UE devices 128, the SINR information being available to the first node 118. This received information can provide an indication of the active mobile UEs in the controlled cell(s) 106 and their approximate locations within the cell 106. This information can already be available in the node 118, by simply checking the number of mobile UEs that have an active Radio Resource Control (RRC) connection established. From this information, a number, A, of active mobile UE devices in the network cell 106 can be determined at step 420 for a first predetermined time period, T1. The predetermined time period, T1, can be measured anywhere from seconds to hours, based on the type of UE being considered and how quickly the network operator seeks to deactivate/activate nodes. At step 430, the first node 118 receives mobility pattern information of the UEs 128 operating and/or located in cell 106.

UE mobility pattern information can be provided, for example, with the UE 128 sending a radio resource control (RRC) connection request to its serving node 118. The RRC connection request can include UE machine device capability information, which may include one or more of a mobility pattern, energy accessibility status, and transmission pattern. Alternately, a UE mobility pattern can be obtained from a GPS device contained on the UE 128 and transmitted when the UE 128 is moved or in response to a machine device capability information request.

The mobility pattern can indicate whether the UE 128 is at a fixed location; i.e., is static. The constancy of connectivity to the same base station 118 can serve as a detection mechanism for low mobility. In this example, each time a UE 128 is determined as being handed over from one node to another node, a handover event is detected; and the total number of handover events for the UE 128 during a time period can be determined. For example, it is possible to characterize the UE mobility based on the number of handover events within a predefined time period as being high or low, depending on whether the number of handover events exceeds a predetermined handover threshold.

Alternately, each time the UE 128 is detected as entering a cell coverage area, a first counter can be incremented; and each time the UE 128 is detected as leaving, or exiting, a cell coverage area, a second counter can be incremented. The total number of cell coverage area entrances and exits are determined by summing the first and second counters for a given time period to produce a total entrance/exit value. The first and second counters can be weighted prior to being summed. The mobility pattern for the UE 128 can be determined by comparing the total number of entrances and exits for the UE 128 during the time period against a predetermined entrance/exit threshold. If the entrance/exit value is greater than the entrance/exit threshold, the mobility pattern is determined to be high mobility, and the mobility pattern information for the UE 128 will include an indication of high mobility. If the entrance/exit value is less than or equal to the entrance/exit threshold, the mobility pattern is determined to be low mobility.

From this mobility pattern information, the node 118 can determine at step 440 the number, B, of static UE devices 128 in the first network cell 106 that are known to be active, Depending on the specific implementation, the devices that are classified as static and the manner in which they are counted may vary. For example, in particular embodiments, those UEs that remain in the cell 106 for a period at least longer than T1 are classified as being static. In particular embodiments, static devices do not report their RSRP to the network and, thus, the procedures that can be used to count such devices may vary from those used to count more mobile UEs. At 450, the node 118 collects the requests for D2D communication, as discussed above. From this information, the number, C, of requests for direct D2D communication during the first time period, T1, can be determined at step 460.

The expected number of active UE devices, S2, in the first network cell 106 during the second time period, T2, is then estimated. In particular embodiments, node 118 may determine this based on the number of active users counted in the first network cell 106 during the first time period, T1. For example, in the illustrated embodiment at step 470, the number, S1, of active UE devices 128 in the first network cell 106 during the first time period T1 is estimated according to the formula:

$$S1 = \text{active users within time period } T1 = (A + B + 2 \times C) \quad (1)$$

Various weighted values of A, B, and or C can be utilized in formula (1) and in formulas (2) and (3) below based on the configuration of the network and the priorities/preferences of the network operator. The estimate S1 of the number of active users for the first time period T1 can serve as the basis for an estimate of the number of active users that will be operating in the same cell during a second time period (e.g., the immediately next time period), T2. Then, the number of active UE devices in the second time period T2, S2, is estimated at step 475. In the example embodiment, the estimate of S2 is determined based on S1 and can be the same as S1, a version of S1 that with the components weighted differently, and/or a version of S1 modified in some other manner based on, for example, additional knowledge about differences in expected user activity between periods T1 and T2. The length of the second time period T2 can be the same as or different from the first time period T1, based on such factors as anticipated network load or network operator priorities/preferences.

At step 480, it is checked if the estimated number of active users S2 for the second time period T2 is less than a first threshold TH1. If this is the case, then at step 485 a request to a neighboring base station (second node) 114 to take over communication with one or more of the UEs 128 is transmitted by the first node 118. In case the estimated number of active users S2 for the second time period T2 is above this first threshold TH1, then the first node 118 will not take any action and goes back to its normal state, at step 410, receiving and gathering reference signal measurements.

The TH1 threshold can be an absolute or a relative threshold, and it can depend on the energy efficiency goals of the network operator. As an example, consider that a given network operator wants to switch off a given base station 118 if the number of the active users 128 is e.g. 20% or less than the maximum number of users supported in the cell 106. As an example, consider that the open access micro base station 118 can serve at maximum 10 users. In case the number of active users, S2, in the second time period is 2, then the open access micro base station 118 is switched off and communication is transferred to the macro base station 114. The TH1 threshold can depend on the type of base station being considered. For example, perhaps a macro base station 114 can support at maximum 40 users; and, hence, the network operator can predetermine to deactivate the node's operation once the number of active users in the controlled cells is below 8.

The take over request to the neighboring, second base station 114 can also contain the number, M, of non-active users in the cell(s) controlled by the first node 118. The request can be either a priority feature, or it can be a standardized message. In either case, the new appositely defined message can be called a Temporary Load Transfer Request, and it can contain as information elements, one or more estimated numbers, S, of active users in the controlled cell(s) 106 for given time periods (e.g., one or both of S1 and S2), T2, one or more numbers, M, of non-active users in the controlled cell(s) 106 for given time periods (e.g., one or both of respective numbers M for the first time period T1 and the second time period T2), and/or the time period, T0, during which the first node 118 is going to be switched off. Alternatively, this request message can contain total numbers of users in the cell 106 (active+non-active) and/or just the number of active users (or non-active users) for one or more relevant time periods, Another option would be to use the existing X2AP message of TS 36.423, version 11.1.0. LOAD INFORMATION.

At a further step, the response from the neighboring macro base station is received and it is determined at step 490 whether the request to handover the active users is accepted by the second node 114. If the request is accepted, then the operations of the first node 118 are deactivated shut down for a particular time period, T0 at step 495. Alternately, the first node 118 can be woken up or otherwise re-activated upon the occurrence of one or more predetermined events, such as the receipt of a predetermined command or signal from a network resource or operator, upon the loss of some or all network resources for the second node 114, and/or upon the second node 114 communicating with more than a predetermined number of UEs. If the first node 118 is re-activated in this manner, communication with the UEs 128 may be transferred back to the first node 118. In case the request to handover the remaining active users is not accepted by the neighboring second node 114, then the first node 118 goes back to its normal operation of receiving and gathering reference signal measurements at step 410.

In particular embodiments, the node 118 can receive one or more DRX parameters from the UEs 128 located in the controlled cell 106. These DRX parameters may include various values relating to the DRX operation of users in the controlled cell 106 and/or information, such as activity states and long DRX cycle numbers for the UEs in cell 106, that can be utilized to determine such DRX-related values.

For example, in particular embodiments, node 118 can receive information that indicates (directly or indirectly) a number, D1, of UEs that are in an inactive state during the first time period, T1, but that are expected to be in an active state during the second time period, T2. Node 118 may also receive information that indicates a number, D2, of UEs that are in an active state during the first time period, T1, but that are expected to be in an inactive state during the second time period, T2. Additionally, node 118 may also receive information that indicates a number of UEs, D3, that are expected to be in an active state during both the first time period, T1, and the second time period T2, as well as a number of UEs, D4, that are expected to be in an inactive state during both the first time period, T1, and the second time period, T2. Depending on the specific implementation, the DRX-related values may include counts of all UEs that satisfy the relevant DRX conditions or only of particular categories of UEs (e.g., stationary UEs) that also satisfy the relevant DRX conditions. For example, in particular embodiments, node 118 may receive DRX information for static UEs including D1, D2, D3, and D4 values indicating the number of static UEs that are configured with DRX active/inactive periods according to the descriptions above.

The number of active UE devices, S1, in the first network cell 106 during the first time period T1 can then be calculated such that:

$$S1 = \text{active users within time period } T1 = (A + D2 + D3 + 2 \times C) \tag{2}$$

The number of active UE devices, S2, in the first network cell 106 during the second time period T2 can then be estimated based on knowledge of the differences between the time periods for the DRX patterns of the UEs operating in the first network cell 106. For example in particular embodiments, the number of UE devices, S2, active during the second time period T2 may be estimated such that:

$$S2 = \text{active users within time period } T2 = (S1 - D2 + D1) \tag{3}$$

As noted above, S1 or any of the various values in Equation (3) may be weighted as appropriate to reflect historical or other data that may affect the estimated number of active users during the second time period T2.

Alternatively, in particular embodiments, S2 may be estimated directly without relying on the total number of users, S1, active during T1. For example, S2 may be estimated such that:

$$S2 = \text{active users within time period } T2 = (A + (D1 + D3) + 2 \times C) \tag{4}$$

Estimating S2 without calculating S1 may be useful, for example, in embodiments in which the number of active users is not calculated on an ongoing basis or the total S1 is not available for other reasons.

As discussed above, received reference signal information can be combined with the angle of arrival information for one or more UEs to consider only a portion of the users—specifically, those operating in a particular portion of the first network cell 106. For example, in particular embodiments, node 118 may only, consider a subset of the static users that are operating in a particular geographic area within the first network cell 106 (e.g., in the vicinity of a suspected hotspot) when calculating S1 and/or S2. As a result, node 118 may determine the number, B', of static UEs 128 active during T1 in the relevant area within and calculate the number of active UE devices, S1', in the relevant area based on, B', as well as on a number of mobile users and a number of D2D users calculated estimated as being active in the entirety of cell 106 (e.g., the values A and C determined as described above). Thus, in such embodiments, node 118 may estimate a number, S1', of active users in the relevant portion of cell 106 during time period T1 such that:

$$S1' = \text{active users in specific cell portion during } T1 = (A + B' + 2 \times C) \tag{5}$$

Furthermore, in particular embodiments, if more detailed information on the current and future location of mobile users and/or D2D users is also available, node 118 may instead utilize values for these types of users that are specific to the relevant area within first network cell 106. For example, in particular embodiments, node 118 may perform the operation of determining a number of active mobile users in cell 106 during time period T1 by determining a number, A', of mobile users active with the relevant portion of cell 106, instead of or in addition to determining the number, A, of mobile users active in the overall first. Similarly, node 118 may perform the operation of determining the number of active D2D users in cell 106 during time period T1 by determining a number, C', of mobile users active within the relevant portion of cell 106. Then, in such embodiments, node 118 may estimate a number, S1', of active users in the relevant portion of cell 106 during time period T1 such that:

$$S1' = \text{active users in a specific portion of cell during } T1 = (A' + B' + 2 \times C') \tag{6}$$

Node 118 may then utilize the calculated number of users, S1', in the relevant area during the first time period T1 to estimate the number of active users within the same area during the second time period, T2. As discussed above, node 118 may estimate S2' to be equal to S1', modify S1' to reflect expected changes, weight S1' or any of its components using an appropriate weighting, and/or estimate S2' in any suitable manner based on S1'. Thus, the process of calculating a number of active users S2 during the time period T2 described above may, in particular embodiments, represent calculating the number of users S2' active in only a part of the first network cell 106.

In general, for any of the embodiments described above, the number of active UE devices 128 in the first network cell 106 during time period T2 can be estimated based on any combination of any of the values described above (e.g., A/A', B, C/C', and/or D1-D4) or based on any of these values individually. The value(s) in question may be weighted, averaged, combined with other relevant data, and/or otherwise processed as appropriate in making the estimation.

As an additional exemplary embodiment, a handover request and subsequent node deactivation can be triggered based on the relative number of estimated active UEs in the first network cell 106 and the second network cell 102. In this embodiment, the number, S3, of estimated active UEs in the second network cell 102 during the second time period, T2, is determined based on one or more of the above techniques. The estimates S2 and S3 are compared against the first threshold TH1 If both S2 and S3 are less than the threshold TH1, communication with the UEs for the node having fewer estimated active UEs is transferred to the node having more estimated active UEs, and the node having fewer estimated active UEs is deactivated.

Figure 5:
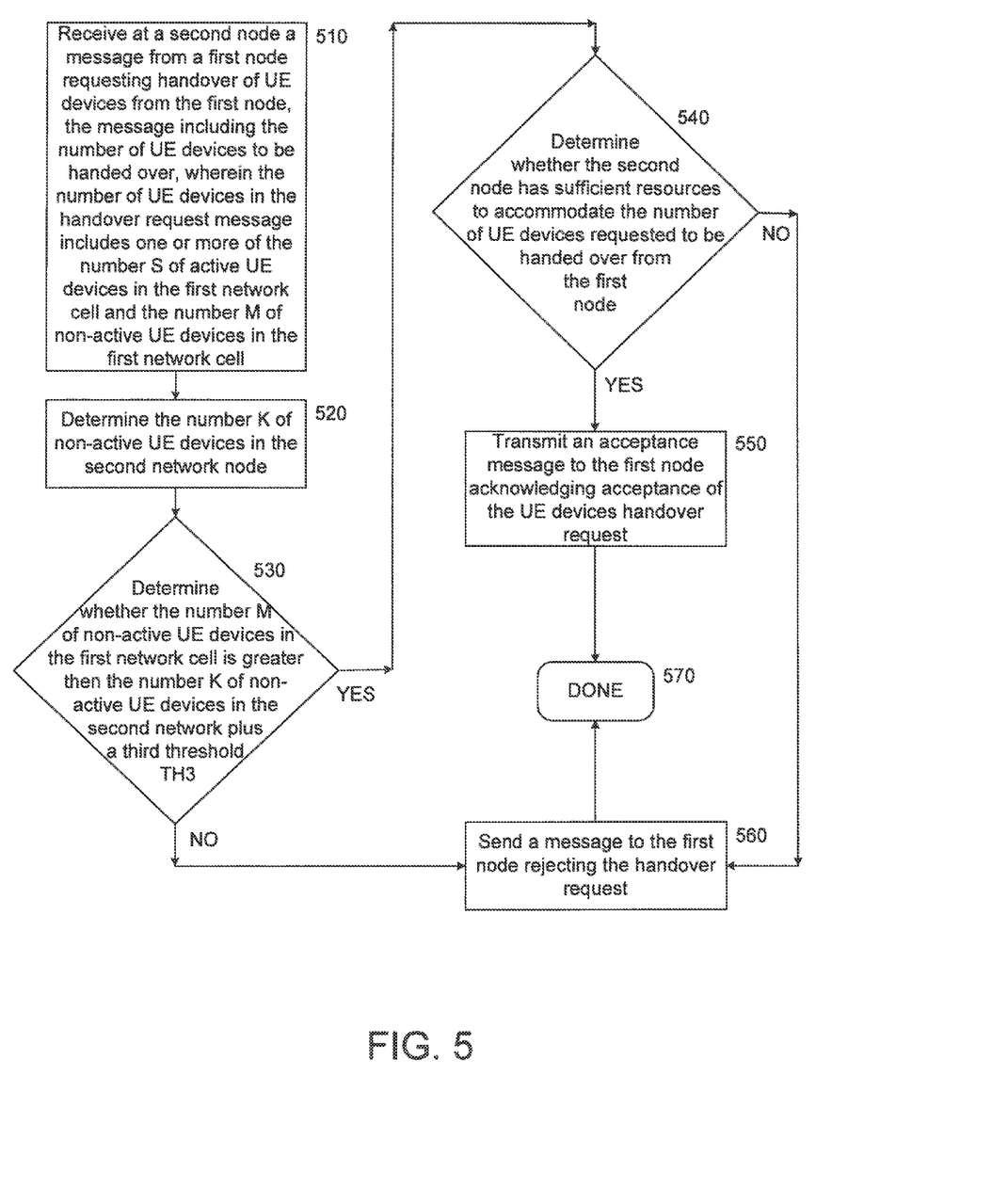
FIG. 5 is a flowchart illustrating the steps for determining whether to accept handover of UE devices from a first node to a second node in accordance with exemplary embodiments of the present invention.

Referring now to FIG. 5, there is shown a flowchart illustrating the steps for determining whether to accept handover of UE devices from a first node 118 to a second node 114 in accordance with exemplary embodiments of the present invention, Once it has been determined that a first node 118 should handover its UEs 128 to another node and shut down, the second node 114 receives a message at step 510 from the first node 118 requesting handover of UE devices from the first node 118, the message including the number of UE devices to handed over to the second node 114. The number of UE devices in the handover request message includes one or more numbers, S (e.g., S1 and/or S2), of active UE devices in the first network cell 106 and the number, M, of non-active UE devices in the first network cell 106. Alternately, the second node 114, upon receiving the handover request message, can transmit a message to the first node 118, asking for the estimated number of active UE devices 128 that will be communicating with the first node 118 during a particular time period.

The second node 114 checks if there are overlapping coverage areas with the first node 118. The rationale for this check is to identify whether the second node 114 can indeed serve the remaining active users of the first node 118 if the first node 118 is shutting down its activity for a period of time, T0. This overlapping area check does not need to be done upon receipt of every request for load transfer from a given neighboring first node 118. This check can be done once, upon the initial setting/configuration of a recently installed/upgraded base station. Information on the overlapping geographic areas between neighboring base stations is available in the Operations, Administration, and Maintenance (OAM) protocol for the communication network 100.

The term overlapping coverage area includes the area which can be covered when the second node 114 boosts its downlink transmission power so as to cover larger area (considering that the uplink can also be operated in this extended coverage area). If there are not overlapping areas between the neighboring base stations, then the second node 114 transmits a negative acknowledgment to the first node 118, rejecting the take over/handover request. This message can be an either a proprietary interface message or a new standardized one. In either case, this message can be termed a Temporary Load Transfer Request Reject. In such a case, the new X2AP message contains a field called Cause. In the case under discussion here, the reason for the rejection can be "Non Overlapping Area". Alternatively, the new "Cause" field can be appended in the existing X2AP message LOAD INFORMATION.

In case there is an overlapping coverage area between the neighboring base stations under discussion here, then the second node 114 determines at step 520 the number, K, of non-active UEs in the second network cell 102, according to the methods discussed above. At step 530, the second node 114 checks whether the number, M, of non-active users in the cell(s) 106 controlled by the neighboring first node 118 having issued the request for load transfer is greater than the number, K, of non-active users in the cell(s) 102 controlled by the second node 114, plus a third threshold, TH3. If this check is satisfied, the process proceeds to step 540; otherwise, the process proceeds to step 560. In this latter case, the cause used in the X2AP message can be of the type "Low Activity on own cells".

The rationale behind the check of step 530 is to see if the current number, K, of non-active users in the cell(s) 102 controlled by the second node 114 is higher than the number, M, of non-active users in the neighboring first node 118 wishing to shut down its operation. If this is the case, it is probably more efficient to shut the second node 114 down for a time period, T0, instead of the first node 118. Due to the different scales of control for the neighboring base stations, the threshold TH3 is used. The TH3 threshold can be positive, negative, or a percentage and can be utilized for favoring shutting down of the second, macro node or the first, micro node. In some cases, the non-satisfaction of the check at step 530 might be the trigger for the shutting down of the current macro second node 114. In this case the procedure described here can be done with the roles of second/first macro and open access pico base stations reversed.

If the check at step 530 is satisfied, then at step 540 the second node 114 further determines whether the second node 114 has sufficient radio, hardware, and software resources to accommodate the indicated S active users to be handed over from the first node 118, This check is equivalent to the admission control taking place in the case of a handover request. If this determination is satisfied, then at step 550, the second node 114 acknowledges the take over request issued by the neighboring first node 118. This acknowledgement can be transmitted in the form of an acceptance message by using the X2AP message Temporary Load Transfer Request Acknowledgement.

In case the resource availability check at step 540 is not satisfied, then the second node 114 sends a rejection message at step 560. In this case the "Cause" field of the X2AP can be "Not sufficient resources". Optionally, the rejection message can specify which resource(s) was not sufficient, e.g. number of available PRBs, CCEs, hardware, or software limitations. Further, as discussed above, this method can be applied to any group of neighboring nodes.

Figure 7:
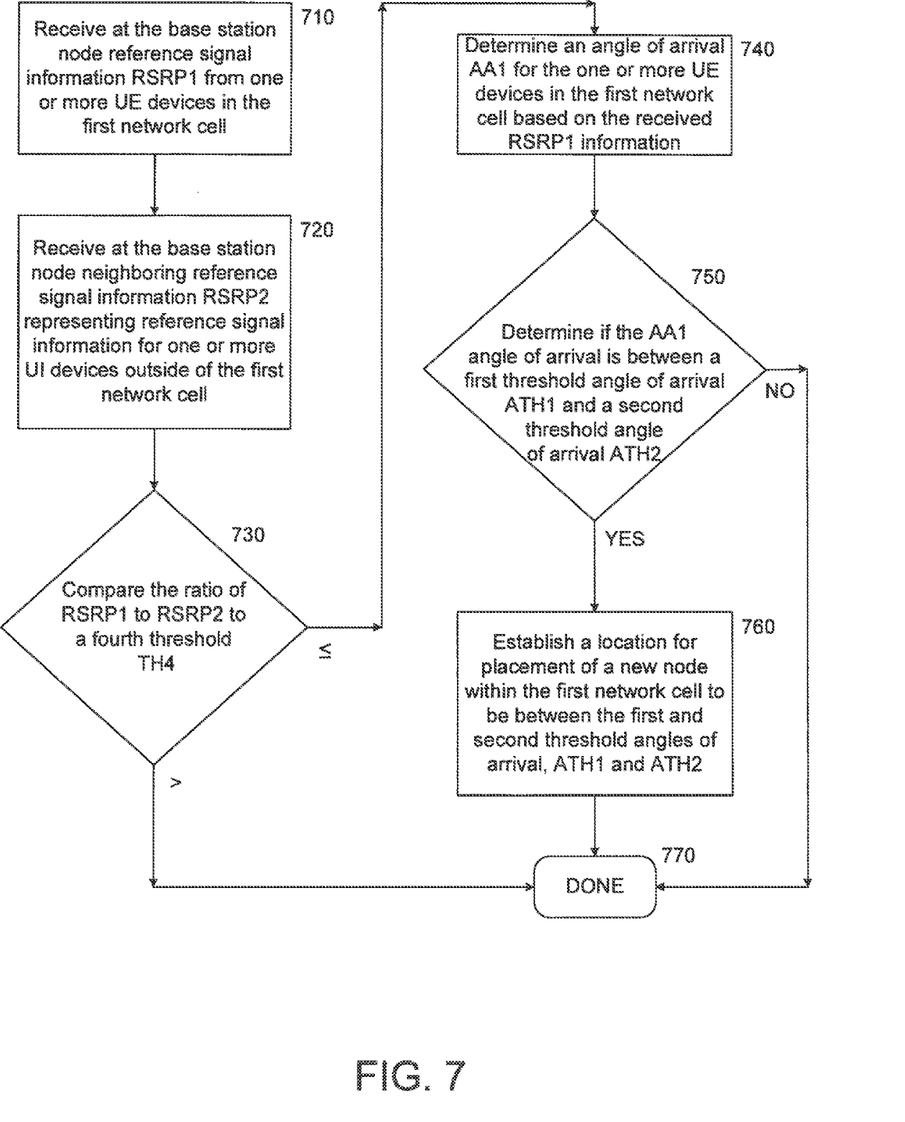
FIG. 7 is a flowchart illustrating the steps for determining the location for placement of a new node in a network cell in accordance with exemplary embodiments of the present invention.

Referring now to FIG. 7, and also to FIG. 6, there is shown a flowchart illustrating the steps for determining the location for placement of a new node in a network cell 602 in accordance with exemplary embodiments of the present invention. As also discussed above, a network node 610, through the collection of reference signal measurements, can obtain better insight into the density of UEs 622 within a geographic sub-area 624 of the node's cell coverage area 602; i.e. the hotspots of the node's UEs 616 and 622. Hotspots of UEs can be detected by the signaling from the UEs for direct D2D communication. As discussed above, this D2D communication can involve signaling between UEs 622 about to communicate directly with the closest (serving) base station 610. While FIG. 6 shows a network architecture of homogeneous network cells 602, 604, and 606, embodiments work equally well in a network architecture that includes heterogeneous network macro cells and micro cells. This signaling between UEs 622 can also involve the transmission of reference signal measurement reporting from these devices. Combining this information with the angle of arrival information of these devices can be a good indicator of UEs 622 within a small geographic area 624 attempting to communicate directly with each other, thereby causing a hotspot.

In case the number of static (or semi static) UEs detected within a given geographic area according to the above is higher than a threshold number, TH5, then this is a fairly good indication that a hotspot of UEs is present. In addition, this is also a good indication that a new base station or relay node should be installed in this area.

Within 3GPP Rel. 11, UEs and wireless instruments/sensors/devices report the power they receive on the reference symbol information, in the form of Reference Symbol Received Power (RSRP). UEs report RSRP in their serving cell 610 (RSRP1) at step 710 and the RSRP Thorn the N strongest neighbors 618 (RSRP2) at step 720, and this information is received at or available to the serving node 610. Users having reported that the RSRP from the serving base station is below a given threshold, TH6, are the devices 624 whose path gain is perceived as being below a given quality, possibly because of bandwidth competition with each other to their node, $$RSRP1 \le TH6 \quad (7)$$

Among these low path power quality UEs, it can be checked how many of these UEs 622 are candidates for having a node added to their area 624 by comparing their RSRP power information to that of their neighboring UEs 618. This comparison is performed at step 730 by determining the ratio of the RSRP1 in the UEs' serving cell 602 to the RSRP2 from the N strongest UEs 618 in a neighboring cell L 604 and comparing this ratio to a fourth threshold, TH4:

$$g_{S,L} = \frac{RSRP1}{RSRP2} \le TH4 \quad (8)$$

If conditions (7) & (8) are met by N UEs 622, then this is an indication that a number of N UEs 622 are gathered at an area 624 close to the borders with the neighboring cell L 604. Very likely, placing and/or activating a low power node at this area 624 would be significantly beneficial for the overall communication network 100.

The received reference signal information can include one or more of Channel Quality Indicator (CQI) information, Reference Signal Received Power (RSRP) information, Reference Signal Received Quality (RSRQ) information, Device to Device (D2D) communication requests, and discontinuous reception (DRX) parameters. The received reference signal information can also include Signal to Interference-plus-Noise Ratio (SINR) information for the one or more UE devices 622, the SINR information being available to the base station node 610.

UE positioning information can refine and add credibility to this hotspot determination/identification. One such measure is the angle of arrival these N UEs 624 have to the serving base station 610, which can be determined based on the UEs' 622 received RSRP1 information as detected through the serving node's antenna 202. At step 740, the angle of arrival, AA1, for a number N' of the UEs 622 is determined based on the received RSRP1 information. The number N' is a subset of the number N of the UEs 622, The outer first and second threshold limits of the angles of arrival, ATH1 and ATH2, for the N UEs 622 can be determined from the received RSRP2 information. At step 750, the angle of arrival AA1 of the number N' of UEs 622 is compared against the first threshold angle of arrival ATH1 and the second threshold angle of arrival ATH2 of the number N of UEs 622, If the angle of arrival AA1 for the number N' UEs 622 is between the first and second threshold angles of arrival ATH1 and ATH2, hence:

$$ATH1 \le AA1 \le ATH2 \quad (9)$$

then at step 760, a location for placement of a new node in the hotspot 624 can be established to be between the first and second threshold angles of arrival ATH1 and ATH2.

An alternative directional measure exists in the Global System for Mobile Communication (GSM) product, where RSRP handover measurement for co-sited cells and the knowledge of the horizontal antenna 202 diagrams of the serving node 610 can be used to determine directional angles from the serving node 610 to the hotspot UEs 622. For example, if the RSRP1 and RSRP2 measures are equal, then the angle of arrival of the measuring UEs is in the middle between the two antenna 202 directions. Other positioning information such as timing advance can also be used to assist and refine hotspot traffic geographic location.

A good location for placing a new small base station is the center of the geographic area 624 which is delineated by the line corresponding to RSRP to the serving cell 610 equal to the RSRP threshold TH6, the borders of the cell L 604, and the area within threshold angles of arrival ATH1 and ATH2. An example of such an area is marked in FIG. 6 as 624.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for deactivating a first node in a communication network, the first node communicating with one or more user equipment (UE) devices in a first network cell, the method comprising:
   receiving at the first node reference signal information from the one or more UE devices;
   determining, during a first time period (T1), from the received reference signal information a number (A) of active mobile UE devices in the first network cell;
   receiving at the first node mobility pattern information from one or more of the UE devices;
   determining, during the first time period, from the received mobility pattern information a number (B) of static UE devices in the first network cell;
   collecting at the first node Device to Device (D2D) communication requests;
   determining, during the first time period, from the collected D2D communication requests a number (C) of requests for direct D2D communication received from UE devices in the first network cell;
   estimating a number of active UE devices (S2) in the first network cell during a second time period (T2) from one or more of the numbers A, B, and C; and
   determining whether the estimated number of active UE devices in the first network cell during the second time period is less than a first threshold (TH1) and, if the estimated number of active UE devices in the first network cell during the second time period is less than the first threshold the method further comprising:

transmitting a request to a second node in the communication network to take over communication with the one or more UE devices in the first network cell; and
deactivating the first node.

2. The method of claim 1, wherein deactivating the first node comprises:
determining whether the request is accepted by the second node; and
in response to determining the request is accepted by the second node, deactivating the first node.

3. The method of claim 2, wherein determining whether the request is accepted by the second node comprises receiving from the second node a reject message that indicates a reason why the request was not accepted.

4. The method of claim 1, further comprising estimating a number of active UE devices (S1) in the first network cell during the first time period based on a sum of A, B, and 2×C, and wherein estimating the number of active UE devices during the second time period comprises estimating the number of active UE devices during the second time period based on the estimated number of active UE devices during the first time period.

5. The method of claim 1, further comprising combining the received reference signal information with angle of arrival information for one or more of the UE devices, and wherein estimating a number of active UE devices in the first network cell during the second time period comprises estimating a number, S2', of active mobile users within a first portion of the first network cell, wherein the first portion comprises less than an entirety of the first network cell.

6. The method of claim 1, further comprising:
receiving discontinuous reception (DRX) parameters from the one or more UE devices; and
determining from the received DRX parameters at least one of:
a number, D1, of static UE devices in an inactive state during the first time period and an active state during the second time period; and
a number, D2, of static UE devices in an active state during the first time period and an inactive state during the second timer period, and wherein estimating the number of active UE devices in the first network cell during the second time period comprises estimating the number of active UE devices during the second time period based on at least one of D1 and D2.

7. The method of claim 6, further comprising determining from the received DRX parameters a number, D3, of static user devices that will be in an active state during both the first time period and the second time period, and wherein estimating the number of active UE devices during the second time period further comprises estimating the number of active UE devices during the second time period based on D3.

8. The method of claim 1, wherein estimating the number of active UE devices in the first network cell during the second time period comprises estimating the number of active UE devices in the second time period based on a weighted estimated of a number of active UE devices (S1) in the first network cell during the first time period.

9. The method of claim 1, wherein the transmitted request indicates an estimated number of active UE devices in the first network cell during at least one of the first time period and the second time period and a number of non-active UE devices in the first network cell during the at least one of the first time period and the second time period.

10. The method of claim 1, wherein if the request is not accepted by the second node, the method further comprising:

receiving from the second node a reject message, the reject message indicating a reason why the request was not accepted.

11. The method of claim 1, further comprising:
prior to deactivating the first node, transferring communication with the one or more UE devices in the first network cell to the second node.

12. The method of claim 1, further comprising:
after transmitting the request to the second node to take over communication with the one or more UE devices, receiving from the second node a request for the number of active UE devices communicating with the first node;
transmitting, to the second node, information indicating an estimated number of active UE devices in the first network cell during at least one of the first time period and the second time period; and
receiving a message from the second node rejecting the request if the indicated number exceeds a second threshold (TH2).

13. The method of claim 1, further comprising adjusting the estimated number of active UE devices in the first network cell during the second time period based on future load information for the first network cell.

14. The method of claim 1, further comprising:
comparing the estimated number S2 of active UE devices in the first network cell with an estimated number of active UE devices (S3) communicating with the second node in a second network cell;
comparing the estimated numbers of active UE devices (S2 and S3) with the first threshold and, if both S1 and S2 are less than the first threshold, the method further comprising:
transferring communication between the UE devices and a node having fewer estimated active UE devices to a node having more estimated active UE devices; and
deactivating the node with the fewer estimated active UE devices.

15. The method of claim 1, further comprising:
re-activating the first node after the occurrence of a predetermined event; and
transferring communication with the one or more UE devices in the first network cell back to the first node.

16. The method of claim 15, wherein the predetermined event comprises one or more of expiration of a time interval, a determination that the second node is communicating with more than a predetermined number of active UE devices, a loss of network resources, and reception of a signal from a network user.

17. A first node operable in a communication network, the first node operable to communicate with one or more user equipment (UE) devices in a first network cell, the first node comprising:
a processor;
a memory coupled to the processor;
a transceiver coupled to the processor; and
an antenna coupled to the transceiver configured to transmit and receive messages,
wherein the processor is configured to:
receive reference signal information from the one or more UE devices;
determine, during a first time period (T1), from the received reference signal information a number (A) of active mobile UE devices in the first network cell;
receive mobility pattern information from one or more of the UE devices;

determine, during the first time period, from the received mobility pattern information a number (B) of static UE devices in the first network cell;

receive Device to Device (D2D) communication requests;

determine, during the first time period, from the collected D2D communication requests a number (C), of requests for direct D2D communication from UE devices in the first network cell;

estimate a number of active UE devices, S2, in the first network cell during a second time period (T2) from one or more of the numbers A, B, and C; and determine whether the estimated number of active UE devices in the first network cell during the second time period T2 is less than a first threshold (TH1); and if the estimated number of active UE devices in the first network cell during the second time period is less than the first threshold:

transmit a request to a second node in the communication network to take over communication with the one or more UE devices in the first network cell; and     deactivate the first node.

18. The first node of claim 17, wherein the processor is configured to deactivate the first node by:

determining whether the request is accepted by the second node; and     in response to determining the request is accepted by the second node, deactivating the first node.

19. A method for determining whether to accept handover of UE devices from a first node to a second node in a communication network, the first node communicating with one or more UE devices in a first network cell and the second node communicating with zero or more UE devices in a second network cell, the method comprising:

receiving at a second node a message from the first node requesting handover of UE devices from the first node;

determining a number (K) of non-active UE devices in the second network cell; and     determining whether a number (M) of non-active UE devices in the first network cell is greater than the number of non-active UE devices in the second network cell plus a threshold (TH3) and, if so, the method further comprising:

determining whether the second node has sufficient resources to accommodate a number of UE devices requested to be handed over from the first node; and         if the second node has sufficient resources to accommodate the number of UE devices requested to be handed over from the first node, transmitting an acceptance message to the first node acknowledging acceptance of the UE devices handover request.

20. The method of claim 19, further comprising:

comparing a geographic coverage of the second network cell with a geographic coverage of the first network cell; and determining whether the geographic coverage of the second network cell overlaps any part of the geographic coverage of the first network cell and, if there is no overlapping coverage between the second network cell and the first network cell sending a message to the first node rejecting the handover request.

21. The method of claim 19, further comprising:

accepting communication, at the second node, with the one or more UE devices in the first network cell; and deactivating the first node.

22. The method of claim 19, further comprising, if the second node does not have sufficient resources to accommodate the number of UE devices requested to be handed over from the first node, transmitting a rejection message to the first node rejecting the handover request.

\* \* \* \* \*